US011179793B2

(12) United States Patent
Atherton et al.

(10) Patent No.: US 11,179,793 B2
(45) Date of Patent: Nov. 23, 2021

(54) AUTOMATED EDGE WELDING BASED ON EDGE RECOGNITION USING SEPARATE POSITIONING AND WELDING ROBOTS

(71) Applicant: AUTODESK, INC., San Rafael, CA (US)

(72) Inventors: Evan Atherton, San Carlos, CA (US); David Thomasson, Fairfax, CA (US); Heather Kerrick, Oakland, CA (US); Hui Li, San Francisco, CA (US)

(73) Assignee: AUTODESK, INC., San Rafael, CA (US)

( * ) Notice: Subject to any disclaimer, the term of this patent is extended or adjusted under 35 U.S.C. 154(b) by 63 days.

(21) Appl. No.: 15/702,637

(22) Filed: Sep. 12, 2017

(65) Prior Publication Data
US 2019/0076949 A1    Mar. 14, 2019

(51) Int. Cl.
*B23K 9/095* (2006.01)
*B25J 9/16* (2006.01)
*B25J 11/00* (2006.01)
*B23K 9/29* (2006.01)

(52) U.S. Cl.
CPC .......... *B23K 9/0953* (2013.01); *B23K 9/0956* (2013.01); *B23K 9/296* (2013.01); *B25J 9/1682* (2013.01); *B25J 9/1684* (2013.01); *B25J 9/1697* (2013.01); *B25J 11/005* (2013.01); *G05B 2219/39132* (2013.01); *Y10S 901/42* (2013.01); *Y10S 901/47* (2013.01)

(58) Field of Classification Search
CPC ............ G05B 2219/49386; G05B 2219/45104
See application file for complete search history.

(56) References Cited

U.S. PATENT DOCUMENTS

| 5,380,978 | A | * | 1/1995 | Pryor | B23K 26/032 219/121.64 |
| 5,465,037 | A | * | 11/1995 | Huissoon | B25J 9/1684 219/124.34 |
| 5,715,375 | A | * | 2/1998 | Ito | B23K 9/1274 700/258 |

(Continued)

OTHER PUBLICATIONS

"Autonomous Weld Joint Detection and Localisation Using Computer Vision in Robotic Arc Welding", Mitchell Dinham, University of Western Sydney Doctoral Thesis, Oct. 2013. Retrieved online onOct. 30, 2019 from <URL: https://pdfs.semanticscholar.org/6a8e/875a0629ac78671d08ae7ff4191ff000bcbe.pdf> (Year: 2013).*

(Continued)

*Primary Examiner* — Kenneth M Lo
*Assistant Examiner* — Jonathan Michael Skrzycki
(74) *Attorney, Agent, or Firm* — Artegis Law Group, LLP

(57) ABSTRACT

A control application implements computer vision techniques to cause a positioning robot and a welding robot to perform fabrication operations. The control application causes the positioning robot to place elements of a structure at certain positions based on real-time visual feedback captured by the positioning robot. The control application also causes the welding robot to weld those elements into place based on real-time visual feedback captured by the welding robot. By analyzing the real-time visual feedback captured by both robots, the control application adjusts the positioning and welding operations in real time.

19 Claims, 12 Drawing Sheets

(56) References Cited

U.S. PATENT DOCUMENTS

| | | | | |
|---|---|---|---|---|
| 5,910,894 A | * | 6/1999 | Pryor | G05B 19/41875 |
| | | | | 700/95 |
| 2006/0245901 A1 | * | 11/2006 | Yamaoka | B25J 9/0096 |
| | | | | 414/692 |
| 2006/0278622 A1 | * | 12/2006 | Inoue | B23K 37/0452 |
| | | | | 219/125.1 |
| 2007/0276539 A1 | * | 11/2007 | Habibi | B25J 9/1697 |
| | | | | 700/245 |
| 2012/0061363 A1 | * | 3/2012 | Saunders | B23K 26/24 |
| | | | | 219/136 |
| 2012/0072021 A1 | * | 3/2012 | Walser | G05B 19/402 |
| | | | | 700/254 |
| 2014/0309762 A1 | * | 10/2014 | Hayata | B25J 9/1682 |
| | | | | 700/114 |
| 2016/0375524 A1 | * | 12/2016 | Hsu | B23K 37/00 |
| | | | | 228/8 |
| 2017/0259373 A1 | * | 9/2017 | Albert | B23K 26/032 |

OTHER PUBLICATIONS

Ming J. Tsai et al., "Machine vision based path planning for a robotic golf club head welding system", 2011, Robotics and Computer-Integrated Manufacturing, vol. 27, pp. 843-849. Retrieved from the Internet on Mar. 31, 2020. (Year: 2011).*

\* cited by examiner

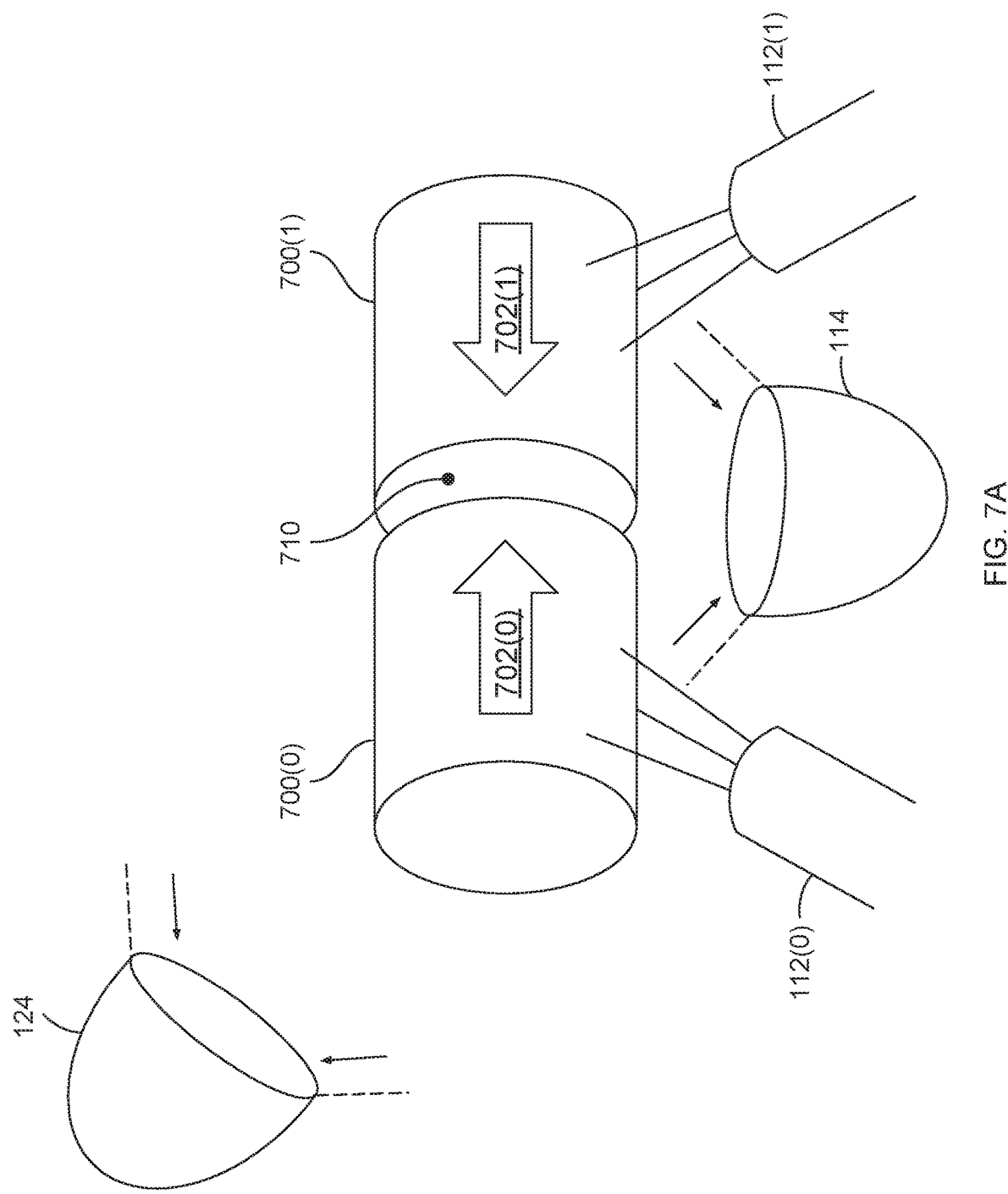

AUTOMATED EDGE WELDING BASED ON EDGE RECOGNITION USING SEPARATE POSITIONING AND WELDING ROBOTS

BACKGROUND OF THE INVENTION

Field of the Invention

Embodiments of the present invention relate generally to robotics and, more specifically, to automated edge welding based on edge recognition.

Description of the Related Art

In a conventional manufacturing environment, industrial robots are configured with specialized hardware for performing individualized mechanical operations. For example, in a conventional automotive assembly line, an industrial robot could be configured with a welder for performing welding operations. In operation, conventional industrial robots are typically programmed to perform one specific task using that specialized hardware. For example, the welding robot mentioned above could be programmed to weld one specific seam on an automobile using the welder.

Human programmers typically program industrial robots to perform particular sequences of movements to execute a specific task. These movements may be specified in a numerical control (NC) program. Continuing with the welding robot example, a human programmer could write an NC program that causes the robot to move the welder to a specific position, activate the welder, trace a predefined trajectory to weld a seam, and then deactivate the welder. This general approach to robot control suffers from certain drawbacks.

In particular, a typical NC program dictates a precise sequence of movements for a robot to follow that depends on exact environmental conditions. When those environmental conditions vary, then the applicable NC program typically cannot be executed properly. For example, referring again to the above welding robot example, in order for the welding robot to weld the seam on the automobile at the correct location, the automobile needs to be located at a specific, expected position relative to the robot, each and every time the robot is to perform the welding operation. However, if the automobile were to arrive at the welding robot just short of the expected position or not at the expected time, then the welding robot would perform the welding operation at the incorrect location, missing the actual location of the seam.

As the foregoing illustrates, what is needed in the art are improved techniques for controlling industrial robots.

SUMMARY OF THE INVENTION

Various embodiments of the present invention set forth a computer-implemented method for fabricating a structure, including causing a first robot to position a first structural element proximate to a second structural element, processing first optical data related to the first structural element to identify a first geometrical feature associated with the first structural element, generating a first toolpath based on the first geometrical feature, and causing a second robot to deposit material on the first geometrical feature based on the first toolpath.

At least one advantage of the techniques described herein is that the control application can tolerate environmental variations when fabricating structures.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 7A-7B illustrate how the robot system of FIG. 1 manipulates an object when depositing material onto a surface of the object, according to various embodiments of the present invention.

DETAILED DESCRIPTION

In the following description, numerous specific details are set forth to provide a more thorough understanding of the present invention. However, it will be apparent to one of skill in the art that the present invention may be practiced without one or more of these specific details.

As discussed above, conventional industrial robots must perform the exact sequences of movements set forth in NC programs and cannot tolerate variations in the environment. When environmental conditions differ from those expected by the NC program, conventional industrial robots may be unable to successfully perform the tasks set forth in that program.

To address this issue, embodiments of the invention include a robot system that includes a positioning robot and a welding robot. The positioning robot and the welding robot interoperate with one another to perform fabrication operations. The positioning robot places elements of a structure at certain positions, and the welding robot then welds those elements into place to fabricate the structure. The positioning robot and the welding robot capture imagery related to the aforesaid positioning and fabrication operations. A control application analyzes this imagery using computer visions techniques to characterize the geometry of the structural elements. Based on this analysis, the control application adjusts the positioning and welding operations in real time. With this approach, the robot system can tolerate environmental variations when fabricating structures.

System Overview

Figure 1:
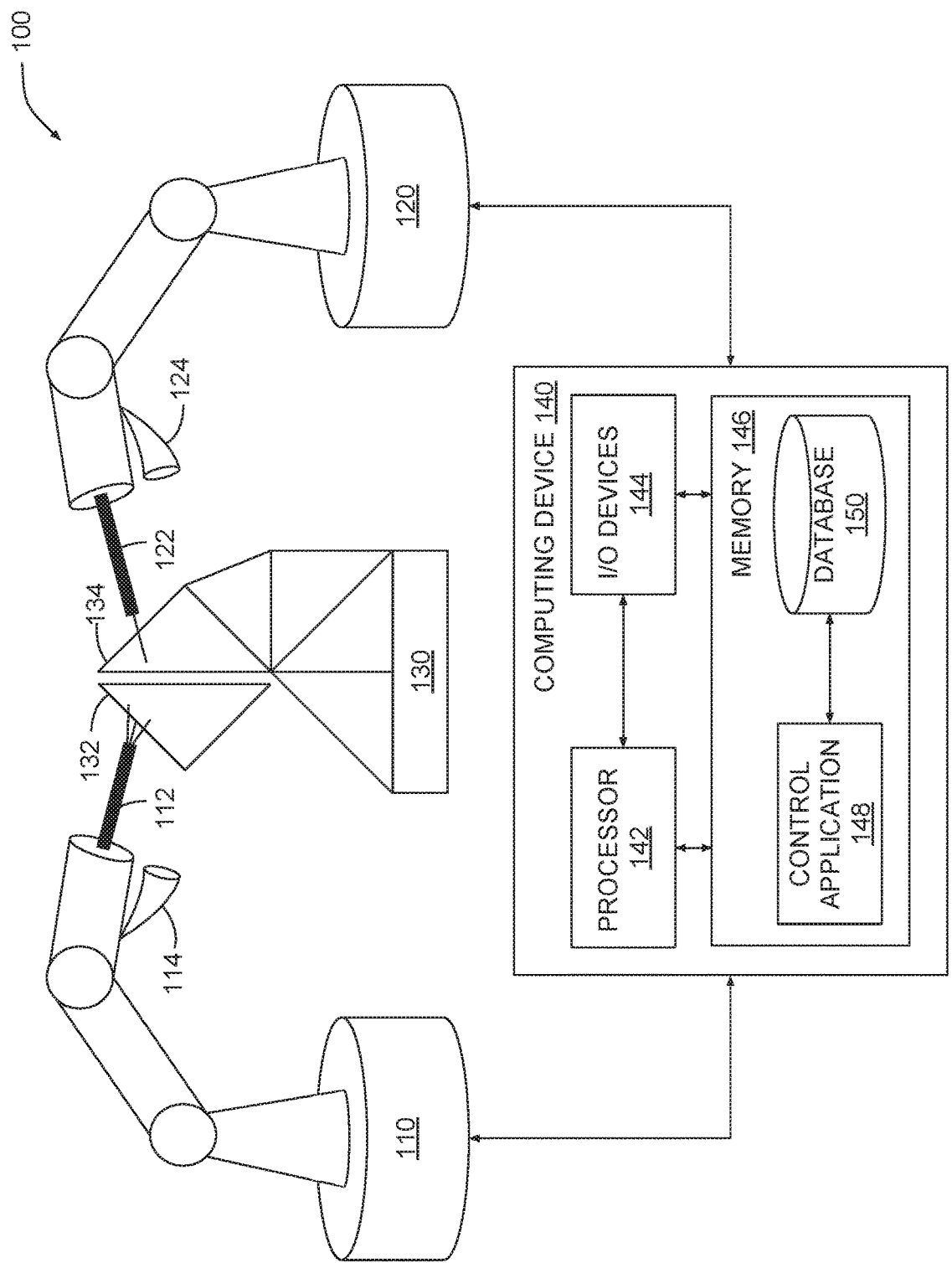
FIG. 1 illustrates a system configured to implement one or more aspects of the present invention.

FIG. 1 illustrates a system configured to implement one or more aspects of the present invention. As shown, a robot system 100 includes a positioning robot 110 and a welding robot 120 configured to cooperatively fabricate a structure 130. Structure 130 may be any technically feasible three-dimensional (3D) structure, including an assembly of polygons, among other possibilities. To fabricate structure 130, positioning robot 110 places structural element 132 proximate to another structural element 134 that may already be attached to structure 130. Then, welding robot 120 performs a welding operation to affix structural element 132 to structural element 134. The positioning and welding operations are described in greater detail below in conjunction with FIGS. 2A-2B.

Positioning robot 110 includes a positioning tool 112 and an optical device 114. Positioning tool 112 may be any technically feasible type of manipulator capable of holding, moving, and positioning physical objects, such as structural element 132. In one embodiment, positioning tool 112 includes a claw-like device, as is shown. In another embodiment, positioning tool 112 includes a suction device. Via positioning tool 112, positioning robot 110 positions polygons and other types of structural elements on or near structure 130 for welding via welding robot 120. In some embodiments, positioning robot 110 is omitted from robot system 100, and a non-robotic entity, such as a human, positions structural element 132 for welding.

Optical device 114 is a sensor configured to capture frames of video imagery related to the fabrication of structure 130, including the positioning and welding operations mentioned above. In practice, optical device 114 is a video camera, although other types of sensors fall within the scope of the present invention, including audio sensors, among others. In one embodiment, optical device 114 is a laser scanner configured to generate a point cloud representation of structure 130 and/or structural elements to be affixed thereto. In another embodiment, optical device 114 is a stereoscopic camera configured to capture binocular video imagery.

Welding robot 120 includes a welding tool 122 and an optical device 124. Welding tool 122 may be any technically feasible device capable of attaching one physical object to another physical object. In one embodiment, welding tool 122 is a metal inert gas (MIG) welder configured to output a superheated welding wire. Via welding tool 122, welding robot 120 is configured to weld physical objects positioned by positioning robot 110 onto structure 130, including structural element 132. Like optical device 114, optical device 124 is a sensor configured to capture frames of video imagery related to the fabrication of structure 130, including the positioning and welding operations mentioned above.

Each of positioning robot 110 and welding robot 120 may be a 6-axis robotic arm or any other technically feasible type of mechatronic device. Both positioning robot 110 and welding robot 120 are coupled to computing device 140. Computing device 140 is configured to coordinate the operation of both robots in fabricating structure 130. In doing so, computing device 140 receives various data signals from positioning robot 110 and welding robot 120, including feedback signals, sensor signals, video frames, and so forth, and then processes those signals to generate commands for controlling those robots. Computing device 140 includes a processor 142, input/output (I/O) devices 144, and a memory 146, as shown.

Processor 142 may be any technically feasible form of processing device configured to process data and execute program code. Processor 142 could be, for example, a central processing unit (CPU), a graphics processing unit (GPU), an application-specific integrated circuit (ASIC), a field-programmable gate array (FPGA), any technically feasible combination of such units, and so forth.

I/O devices 144 may include devices configured to receive input, including, for example, a keyboard, a mouse, and so forth. I/O devices 144 may also include devices configured to provide output, including, for example, a display device, a speaker, and so forth. I/O devices 144 may further include devices configured to both receive and provide input and output, respectively, including, for example, a touchscreen, a universal serial bus (USB) port, and so forth.

Memory 146 may include any technically feasible storage medium configured to store data and software applications. Memory 146 could be, for example, a hard disk, a random access memory (RAM) module, or a read-only memory (ROM), among others. Memory 146 includes a control application 148 and a database 150. Control application 148 is a software application that, when executed by processor 142, implements a closed-loop control process that is described in greater detail below in conjunction with FIG. 3.

Figure 2A:
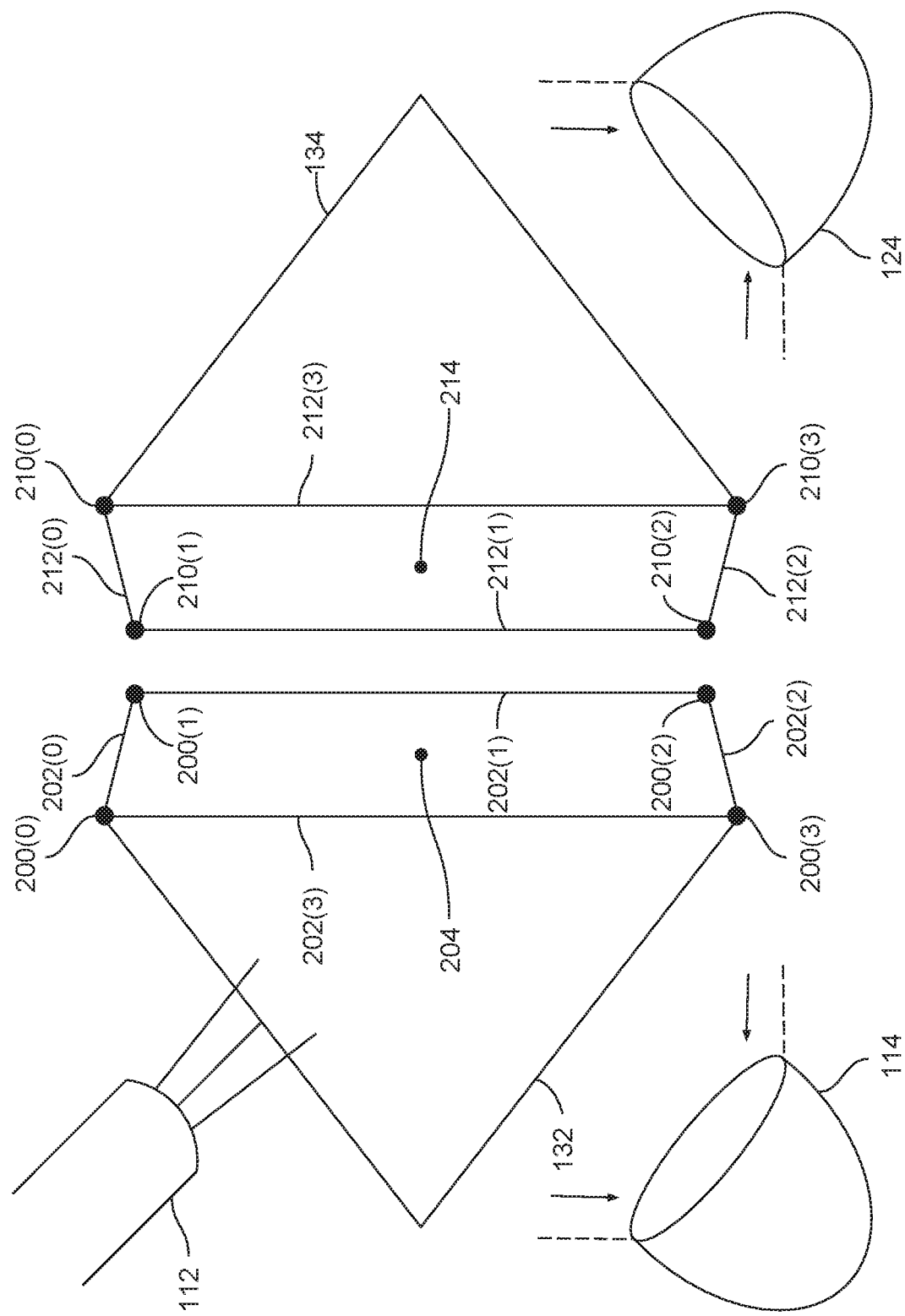
FIGS. 2A-2B illustrate how the robot system of FIG. 1 deposits material along a surface of a structure, according to various embodiments of the present invention.
Figure 2B:
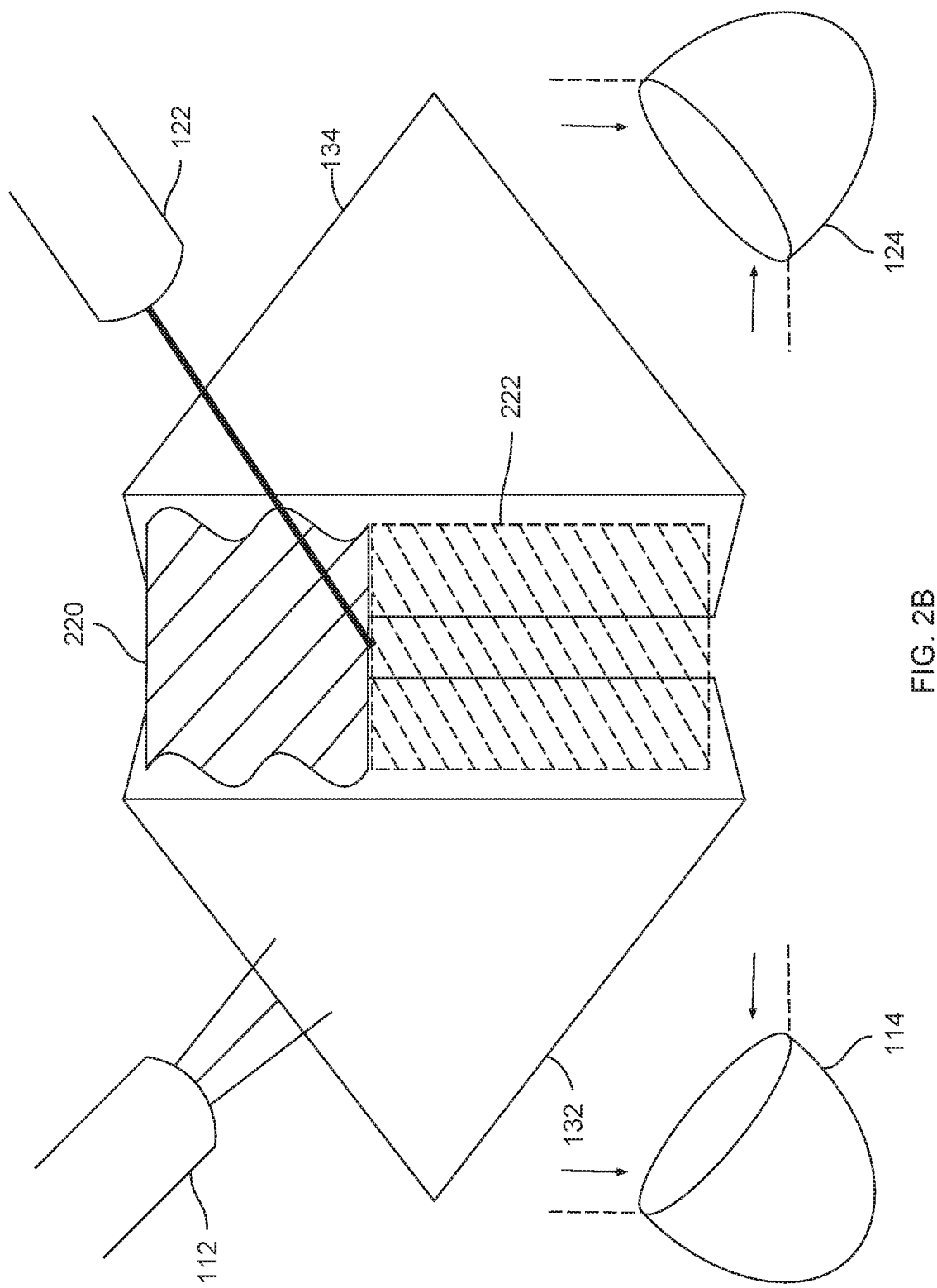

FIGS. 2A-2B illustrate how the robot system of FIG. 1 deposits material along a surface of a structure, according to various embodiments of the present invention. As shown in FIG. 2A, via positioning tool 112, robot 110 manipulates structural element 132 such that one side of structural element 132 is adjacent to one side of structural element 134.

Optical devices 114 and 124 capture video data related to this positioning operation, thereby providing visual feedback to control application 148 and allowing control application 148 to implement closed-loop control over robot 110. In the configuration shown, optical devices 114 and 124 may capture somewhat similar video imagery that differs based on the distance between those optical devices. In this manner, optical devices 114 and 124 may be used to generate stereoscopic visual data. In one embodiment, control application 148 may cause robots 110 and 120 to adjust the distance between optical devices 114 and 124 in order to change the resolution of depth perception achieved by comparing images captured by those devices.

Control application 148 processes video data captured by optical devices 114 and 124 using computer vision algorithms to identify specific features of structural elements 132 and 134 and the precise positions and/or orientations of those features. In particular, control application 148 identifies vertices 200(0), 200(1), 200(2), and 200(3) of structural element 132 and the positions of those vertices. Control application 148 also identifies edges 202(0), 202(1), 202(2), and 202(3) of structural element 132, as well as the positions and orientations of those edges. Control application 148 also identifies face 204, along with the precise position and orientation of that face and potentially contours of face 204. In similar fashion, control application 148 identifies the positions and/or orientations of vertices 210(0) through 210(3), edges 212(0) through 212(3), and face 214 of structural element 134 (and contours thereof).

Persons skilled in the art will understand that a wide variety of computer vision techniques may be applied to detect specific features of structural elements 132 and 134, including edge detection, contour mapping, point cloud analysis, and so forth. As a general matter, control application 148 is configured to characterize the geometry of structural elements 132 and 134 in order to develop a strategy for welding structural element 132 to structural element 134, as discussed in greater detail below in conjunction with FIG. 2B.

As shown in FIG. 2B, via welding tool 122, robot 120 deposits welding material 220 between faces 204 and 214 of structural elements 132 and 134. Welding material 220 is a continuous weld bead that may be composed of any technically feasible substance, including molten plastic, metal or glass, among other things. Welding material 220 generally has sufficient bonding strength to bind structural elements 132 and 134 together. Welding robot 120 deposits welding material 220 within a region 222.

When robot 120 deposits weld material 220, control application 148 processes video data captured by optical devices 112 and 124 and implement a closed-loop control process to control robot 120. In doing so, control application 148 may cause robot 120 to deposit welding material 220 at specific positions relative to any of the features identified via the computer vision techniques described above in conjunction with FIG. 2A. For example, control application 148 could cause robot 120 to deposit welding material 220 along specific edges 200/210 of structural elements 132/134, at particular vertices 202/212 of structural elements 132/134, or on certain faces 204/214 of structural elements 132/134. Control application 148 may also indicate specific welding parameters for welding robot 120 to use during welding. For example, control application 148 could indicate a given material feed rate for welding a certain feature, or specify a given welding temperature for welding a particular vertex.

Referring generally to FIGS. 2A-2B, control application 148 implements the closed-loop control process mentioned above in order to implement real-time dynamic control over robots 110 and 120. Control application 148 thus causes robot 110 to position structural elements in conjunction with robot 120 welding those elements in an efficient and optimized manner. Control application 148 is described in greater detail below in conjunction with FIG. 3.

Figure 3:
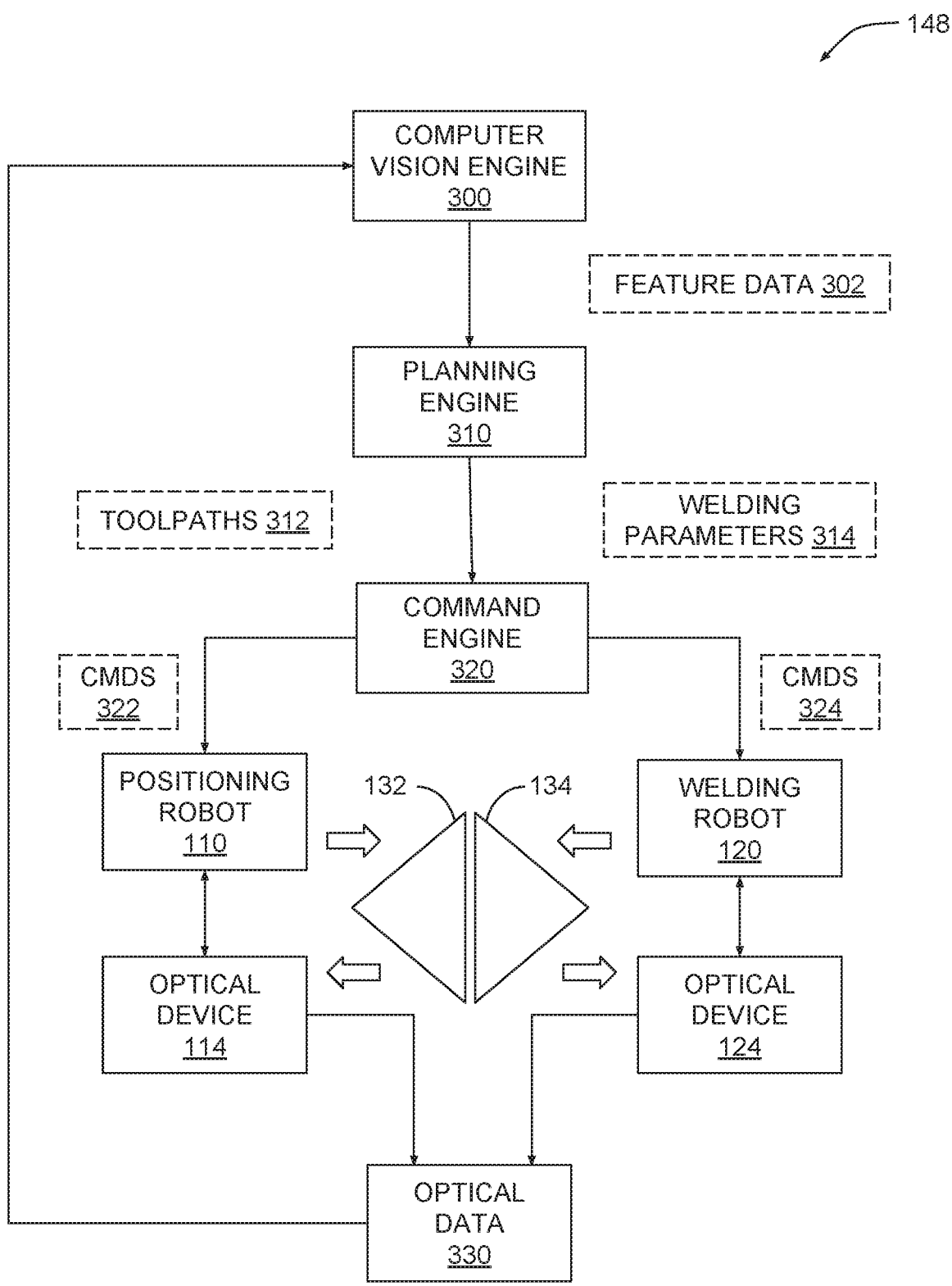
FIG. 3 is a more detailed illustration of the control application of FIG. 1, according to various embodiments of the present invention.

FIG. 3 is a more detailed illustration of the control application of FIG. 1, according to various embodiments of the present invention. As shown, control application 148 includes a computer vision engine 300, a planning engine 310, and a command engine 320. Control application 148 communicates with positioning robot 110 and welding robot 120, to which optical devices 114 and 124 are respectively coupled. Optical devices 114 and 124 generate optical data 330 that reflects positioning robot 110 manipulating structural elements 132 and/or 134 and welding robot 120 depositing material onto structural elements 132 and/or 134.

In operation, computer vision engine 300 receives optical data 330 from optical devices 114 and 124 and then processes that data to identify the various features shown in FIG. 2A. Computer vision engine 300 may implement any technically feasible set of feature recognition algorithms, including edge detection algorithms, texture detection algorithms, contour mapping algorithms, and so forth, in order to identify those features. Computer vision engine 300 then generates feature data 302 to describe these features, including geometric attributes of the features and position and orientation data associated with those features.

Planning engine 310 receives feature data 302 and then implements a multi-objective solver to determine an optimal strategy for affixing structural element 132 to structural element 134. For example, planning engine 310 could execute a generative design program to generate specific geometry for welding material 220 that optimizes bonding strength of that material. Then, planning engine 310 could develop a particular fabrication strategy that can be executed by positioning robot 110 and welding robot 120 to produce welding material 220 according that geometry. Planning engine 310 may define the fabrication strategy in toolpaths 312 and welding parameters 314. Toolpaths 312 indicate specific trajectories for positioning tool 112 and welding tool 122 to follow during positioning and welding operations, respectively. Welding parameters 314 set forth various parameters associated with the welding operation, including material feed rates, welding temperatures, and so forth. Welding parameters 314 may be expressed as a function of toolpaths 312. For example, the material feed rate implemented by welding robot 120 could vary as a function of the distance along a given toolpath 312 that welding robot 120 follows.

In one embodiment, planning engine 310 implements a Machine Learning (ML) algorithm that is initially trained via observation of humans demonstrating positioning and welding operations. For example, one or more humans could use virtual reality (VR) systems to simulate positioning and welding operations within a VR environment. These demonstrations could be used to build an ML model for training planning engine 310.

Control engine 320 receives toolpaths 314 and welding parameters 312 and then generates commands (cmds) 322 to be executed by positioning robot 110 and cmds 324 to be executed by welding robot 120. Based on cmds 320, positioning robot 110 manipulates structural element 132 and/or 134. Optical devices 114 and 124 capture optical data 330 that reflects these manipulations. Based on cmds 324, welding robot 120 deposits welding material onto structural elements 132 and/or 134. Optical devices 114 and 124 capture optical data 330 that reflects this deposition. Computer vision engine 300 receives optical data 330 and proceeds as described above.

In this manner, control application 148 implements a real-time closed-loop control process to generate and update a fabrication strategy for welding structural elements. Accordingly, control application 148 can detect and respond to environmental variations in real time based on visual feedback related to the fabrication process. This process is described in FIGS. 4A-4B as a series of steps.

Figure 4A:
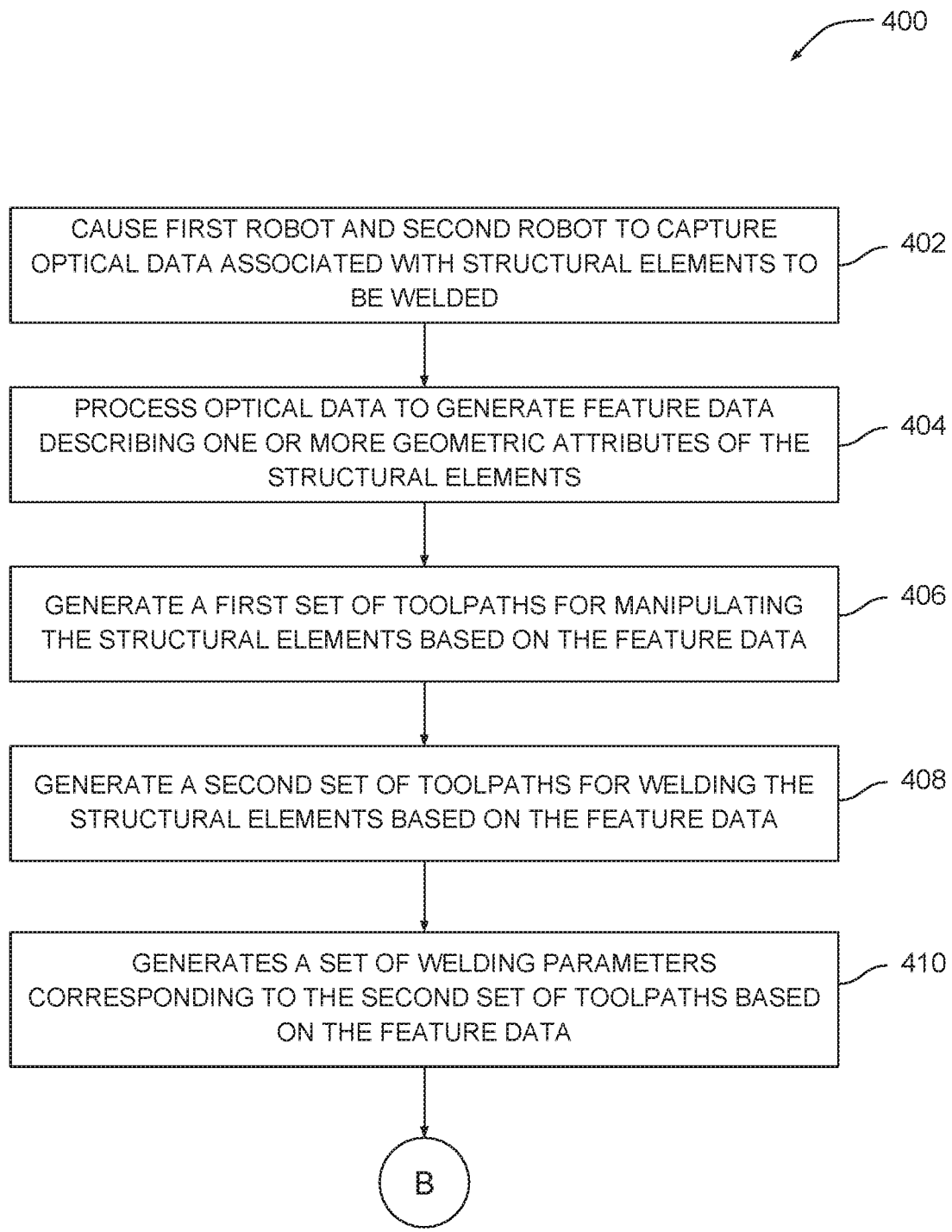
FIGS. 4A-4B set forth a flow diagram of method steps for depositing material along a surface of a structure, according to various embodiments of the present invention.
Figure 4B:
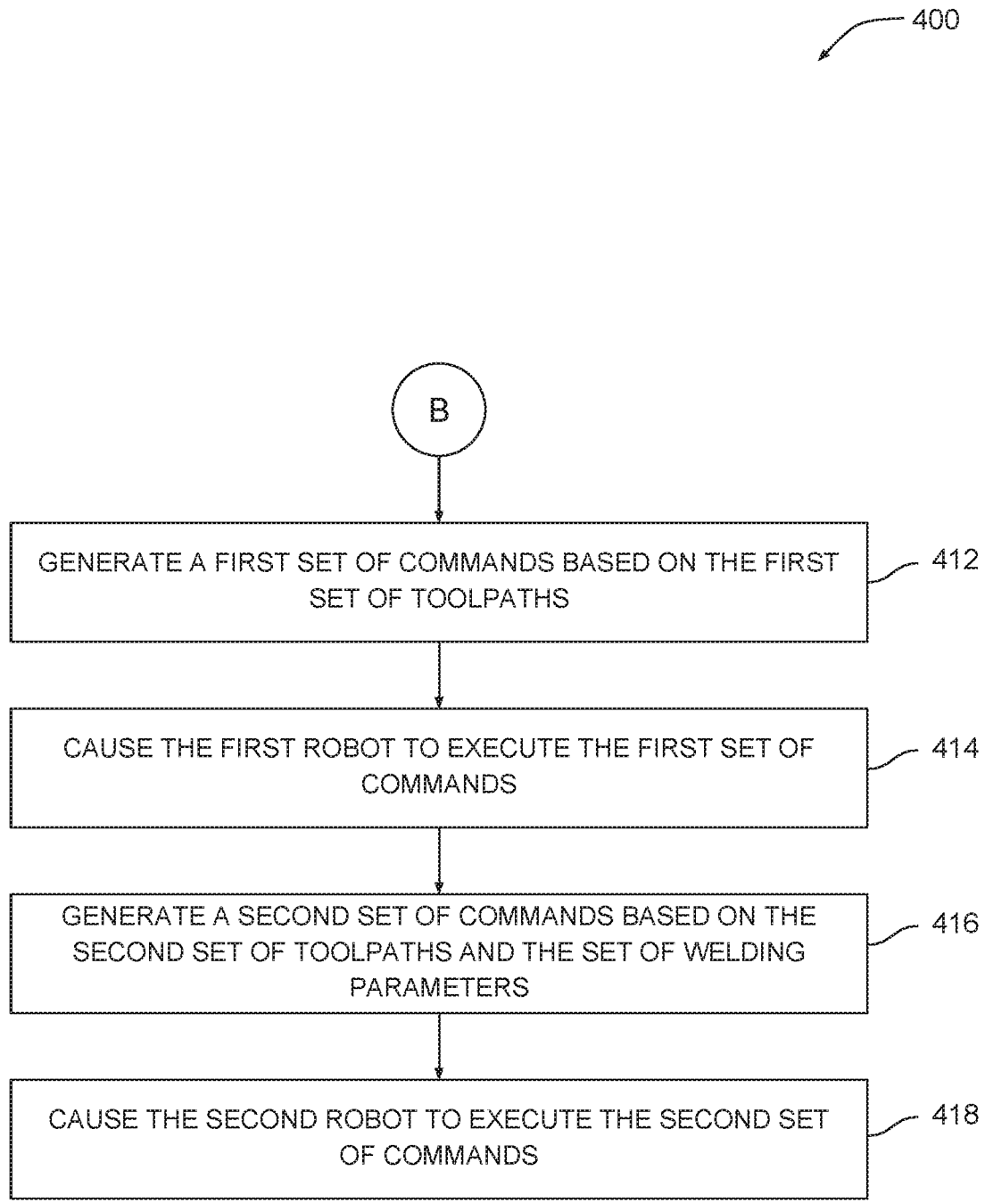

FIGS. 4A-4B set forth a flow diagram of method steps for depositing material along a surface of a structure, according to various embodiments of the present invention. Although the method steps are described with respect to the systems of FIGS. 1-3, persons skilled in the art will understand that any system configured to perform the method steps, in any order, falls within the scope of the present disclosure.

As shown in FIG. 4A, a method 400 begins at step 402, where control application causes a first robot and a second robot to capture optical data associated with structural elements to be welded. The first robot could be positioning robot 110, while the second robot could be welding robot 120, for example. The two robots capture optical data using optical devices, such as optical devices 114 and 124. The structural elements may be structural elements 132 and 134 shown in FIG. 1, among other possibilities.

At step 404, control application 148 processes optical data captured at step 402 to generate feature data. The feature data describes one or more geometric attributes of the structural elements. The feature data may include any of the features shown in FIG. 2A, among others.

At step 406, control application 148 generates a first set of toolpaths for manipulating the structural elements based on the feature data. At step 408, control application 148 generates a second set of toolpaths for welding the structural elements based on the feature data. At step 410, control application 148 generates a set of welding parameters corresponding to the second set of toolpaths based on the feature data.

The first set of toolpaths, the second set of toolpaths, and the welding parameters may collectively define a fabrication strategy for fabricating a structure. In one embodiment, control application 148 executes a multi-objective solver to generate this fabrication strategy. The multi-objective solver may optimize specific design objectives, such as bond strength associated with deposited welding material, while respecting specific design constraints, including total amount of welding material consumed.

As shown in FIG. 4B, the method 400 continues at step 412, where control application 148 generates a first set of commands based on the first set of toolpaths. At step 414, control application 148 causes the first robot to execute the first set of commands. In doing so, the first robot manipulates the structural elements, thereby positioning those elements relative to the structure in order to facilitate material deposition.

At step 416, control application 148 generates a second set of commands based on the second set of toolpaths and the set of welding parameters. At step 418, control application 148 causes the second robot to execute the second set of commands. In doing so, the second robot deposits welding material on the structural elements to form a bond between those elements.

The method 400 may then return to step 402 and repeat. The first and second robots may also capture the optical data at step 402 in conjunction with executing the commands generated at steps 412 and 416. In this manner, control application 148 implements a closed-loop control process to dynamically control the first and second robots in a coordinated manner. FIGS. 5A-7B set forth examples of how control application 148 coordinates robot activities to achieve different types of fabrication operations.

Exemplary Positioning and Welding Operations

Figure 5A:
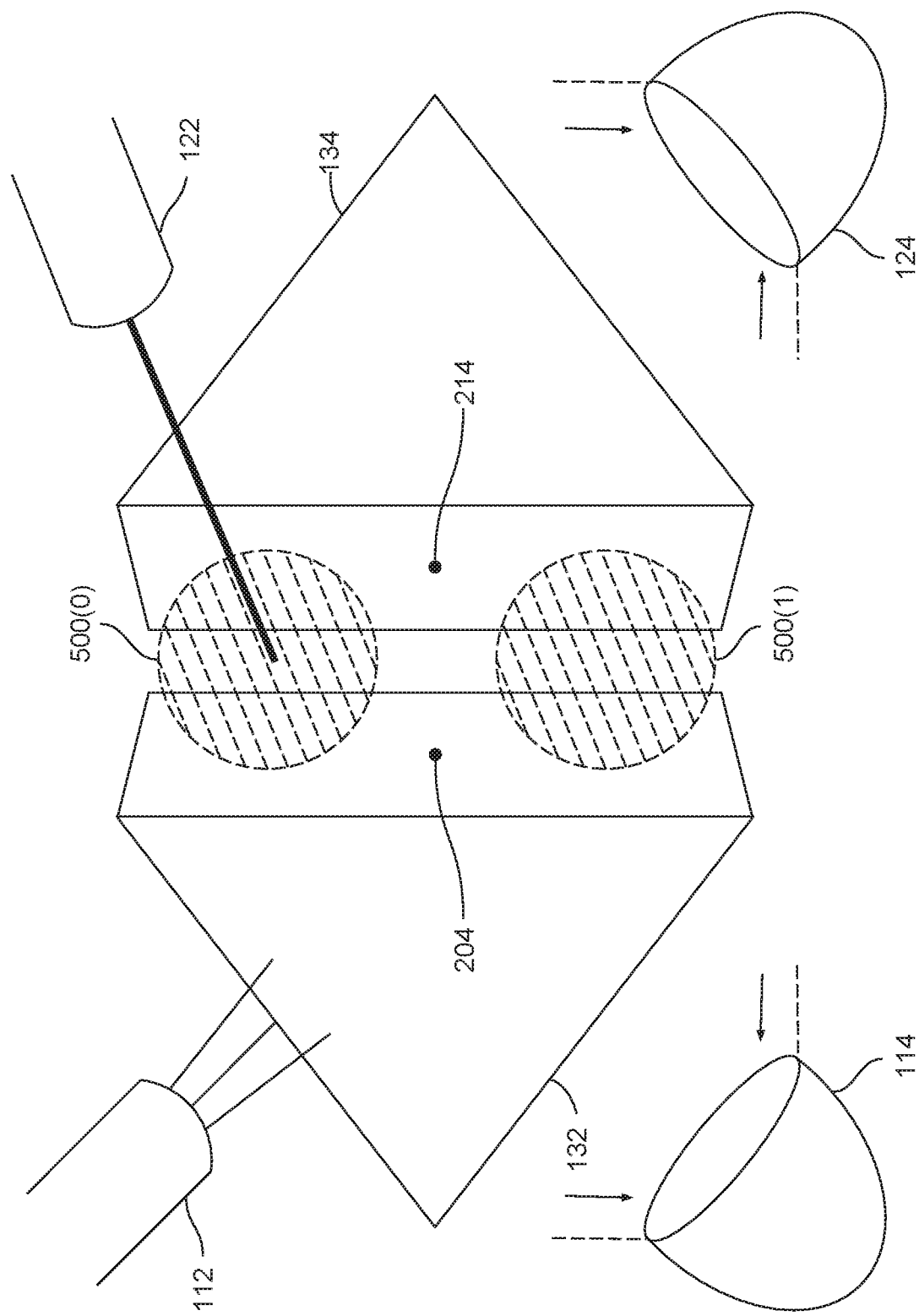
FIGS. 5A-5B illustrate how the robot system of FIG. 1 deposits material onto a surface of a structure with multiple passes, according to various embodiments of the present invention.
Figure 5B:
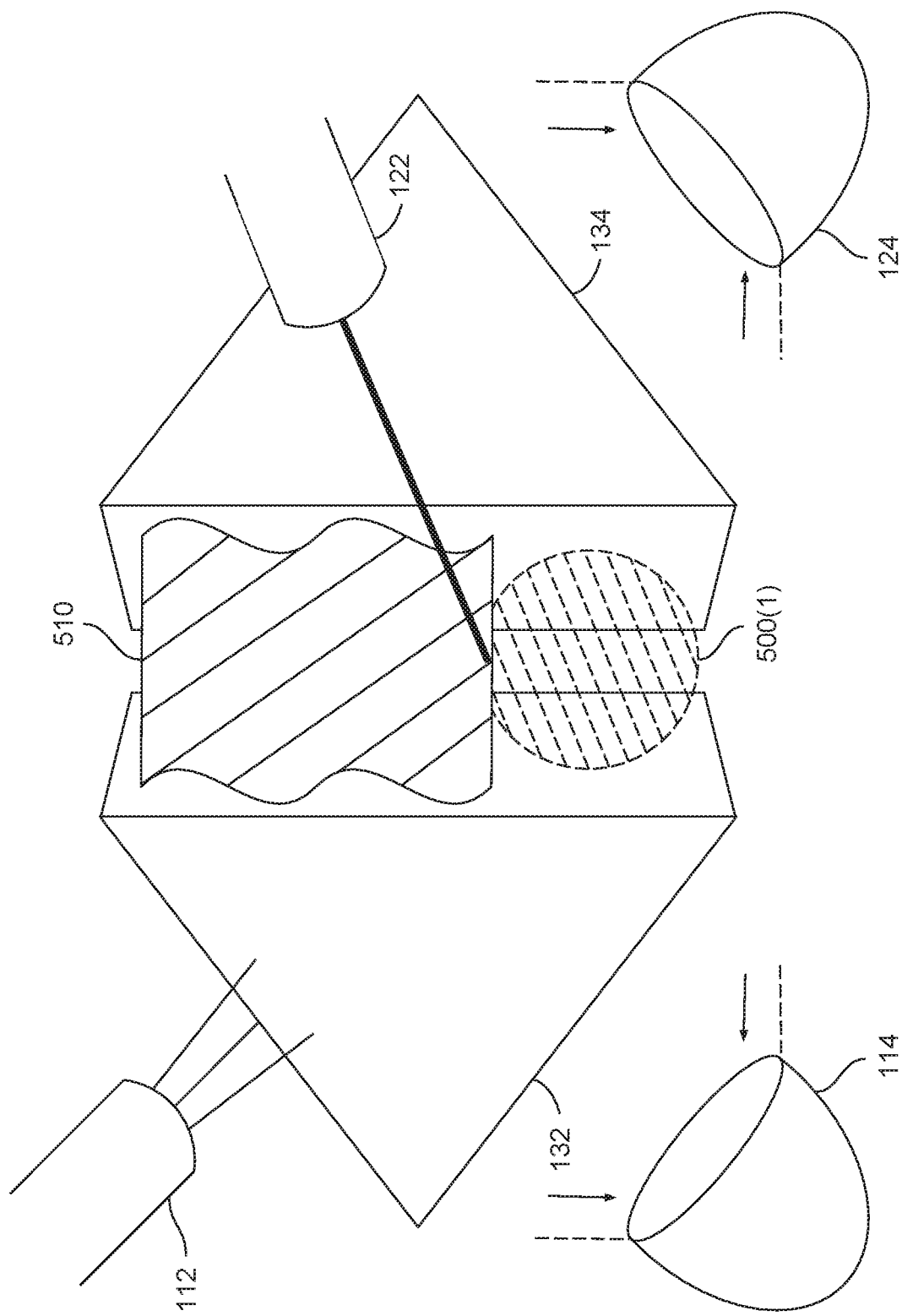

FIGS. 5A-5B illustrate how the robot system of FIG. 1 deposits material onto a surface of a structure with multiple passes, according to various embodiments of the present invention.

As shown in FIG. 5A, via positioning tool 112, positioning robot 110 places structural elements 132 proximate to structural element 134. Then, via welding tool 122, welding robot 120 deposits weld beads 500(0) and 500(1) between faces 204 and 214 of structural elements 132 and 134, respectively. Welding robot 120 may deposit weld beads 500 using spot welding techniques, among other approaches. Welding robot 120 deposits weld beads 500 during a first welding pass, and then performs a second welding pass. As shown in FIG. 5B, after depositing weld beads 500, welding robot 120 then performs a second welding pass to deposit welding material 510. During the second welding pass, positioning robot 110 continues to position structural element 132 to facilitate welding.

Referring generally to FIGS. 5A-5B, control application 148 generates commands to cause positioning robot 110 and welding robot 120 to operate in the manner described above based on optical data captured by optical devices 114 and 124. In particular, control application 148 processes that optical data using the computer vision techniques discussed above to determine that multiple welding passes are needed. For example, control application 148 could determine that edges 202 and 212 are sufficiently long that one welding pass would not be sufficient to bind structural elements 132 and 134 together with appropriate strength. Or, control application 148 could determine that the gap between faces 204 and 214 is sufficiently wide that multiple passes may be needed to completely fill that gap with welding material.

Control application 148 may also determine specific positions to place welding beads 500 based on identified geometric attributes of structural elements 132 and 134. For example, control application 148 could identify specific locations where faces 204 and 214 are closest to one another (e.g. due to contour variations), and then determine that weld beads 500 should be placed at those locations. Control application 148 may also determine that more than two passes are needed, as well. For example, control application 148 could implement a first pass to deposit a first set of weld beads, a second pass to deposit a second set of weld beads, and then a finishing pass to completely fill the gap between structural elements 132 and 134.

As a general matter, control application 148 determines the particular welding strategy based on analyzing optical data related to structural elements 132 and 134 using computer vision. Control application 148 may also update that welding strategy relative to variations in structural elements 132 and 134, as described in greater detail below in conjunction with FIGS. 6A-6B.

Figure 6A:
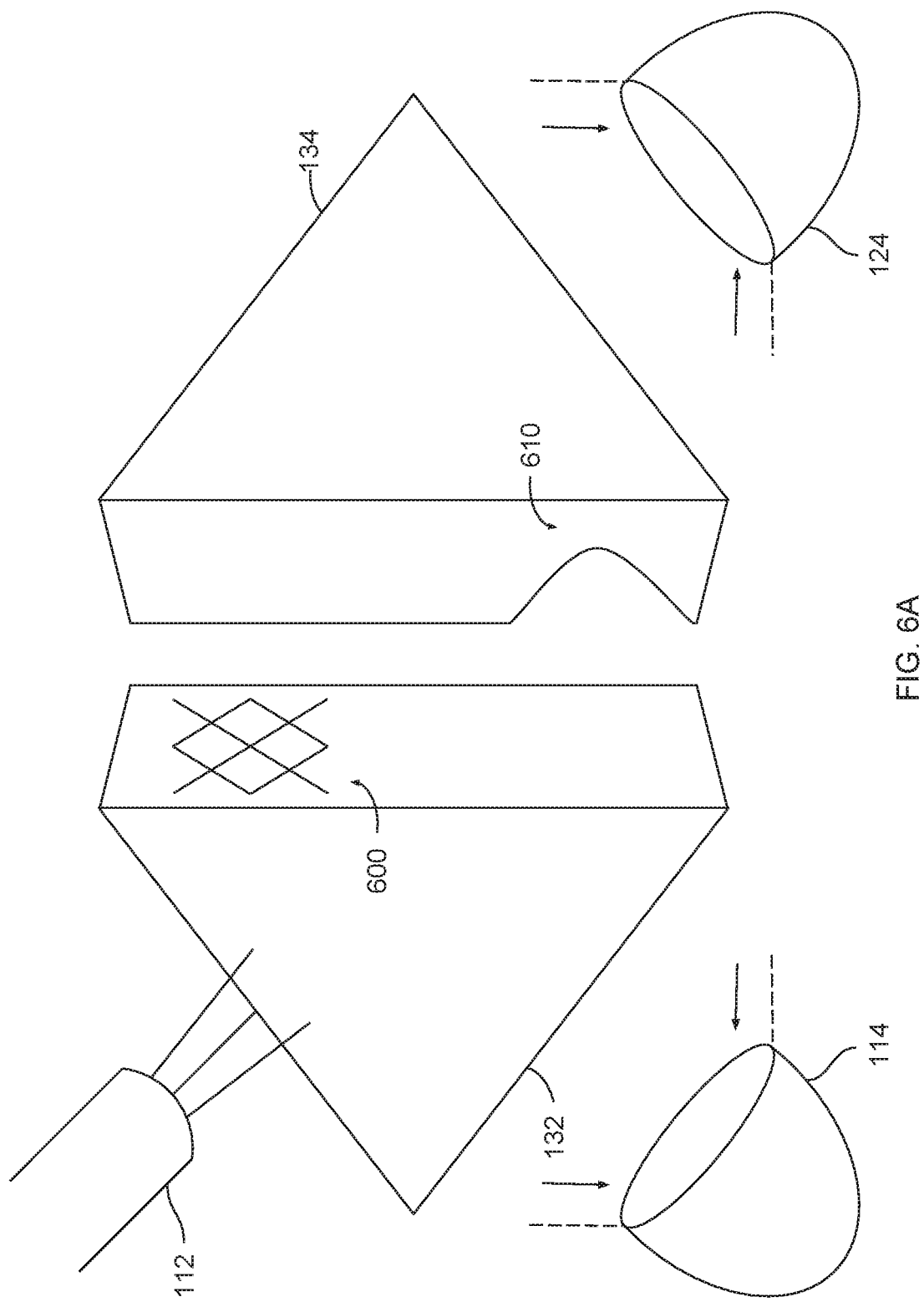
FIGS. 6A-6B illustrate how the robot system of FIG. 1 compensates for structural variations when depositing material onto a surface of a structure, according to various embodiments of the present invention.
Figure 6B:
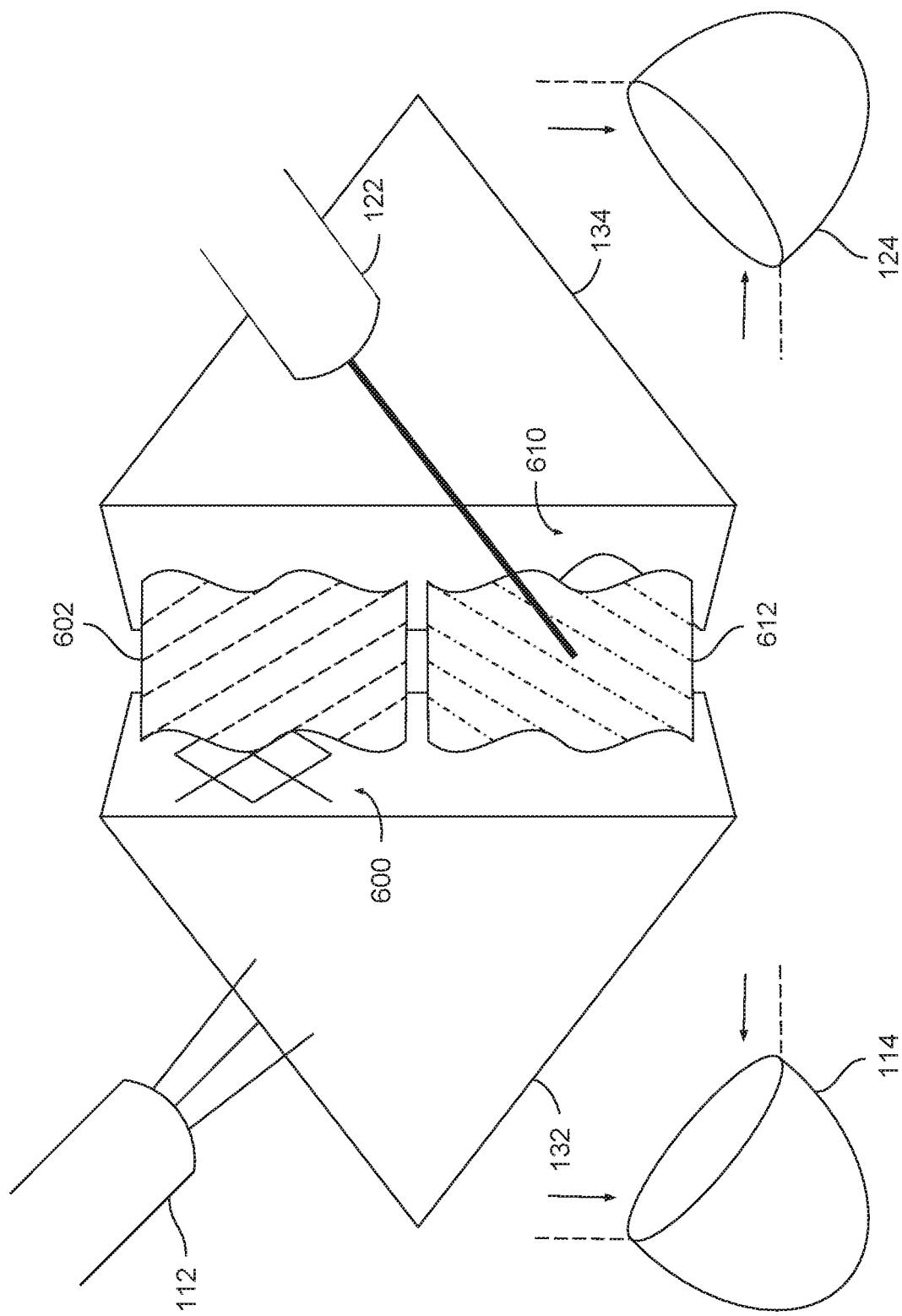

FIGS. 6A-6B illustrate how the robot system of FIG. 1 compensates for structural variations when depositing material onto a surface of a structure, according to various embodiments of the present invention.

As shown in FIG. 6A, structural elements 132 and 134 have structural variations that may interfere with the welding process performed by welding robot 120. In particular, structural element 132 includes abnormal texture 600. Abnormal texture 600 could be caused, for example, by process variations that occurred during manufacture of structural element 132. In addition, structural element 134 includes a notch 610. Notch 610 could be caused by accidental damage, for example. Abnormal texture 600 and notch 610 represent, by way of example, different abnormalities associated with structural elements 132 and 134 that, without compensation, might interfere with welding. However, control application 148 is configured to detect such abnormalities and then adjust welding accordingly.

As shown in FIG. 6B, control application 148 causes welding robot to deposit welding material 602 proximate to abnormal texture 600 and deposit welding material 612 proximate to notch 610. Although welding materials 602 and 612 may have the same chemical composition, those materials can be deposited with different welding parameters to compensate for the specific abnormalities nearby. For example, to compensate for abnormal texture 600, control application 148 could cause welding robot 120 to deposit welding material 602 with a higher heat level than normal, thereby improving bonding strength with abnormal texture 600. Similarly, to compensate for notch 610, control application 148 could cause welding robot 120 to deposit welding material 612 with a higher material feed rate, thereby filling in notch 612.

Referring generally to FIGS. 6A-6B, control application 148 may implement any technically feasible form of object recognition algorithm to identify generic classes of abnormalities, including the specific examples discussed above. In addition, control application 148 may implement machine learning techniques to learn to identify new classes of abnormalities not observed previously. In this manner, control application 148 may improve welding techniques over time.

Figure 7B:
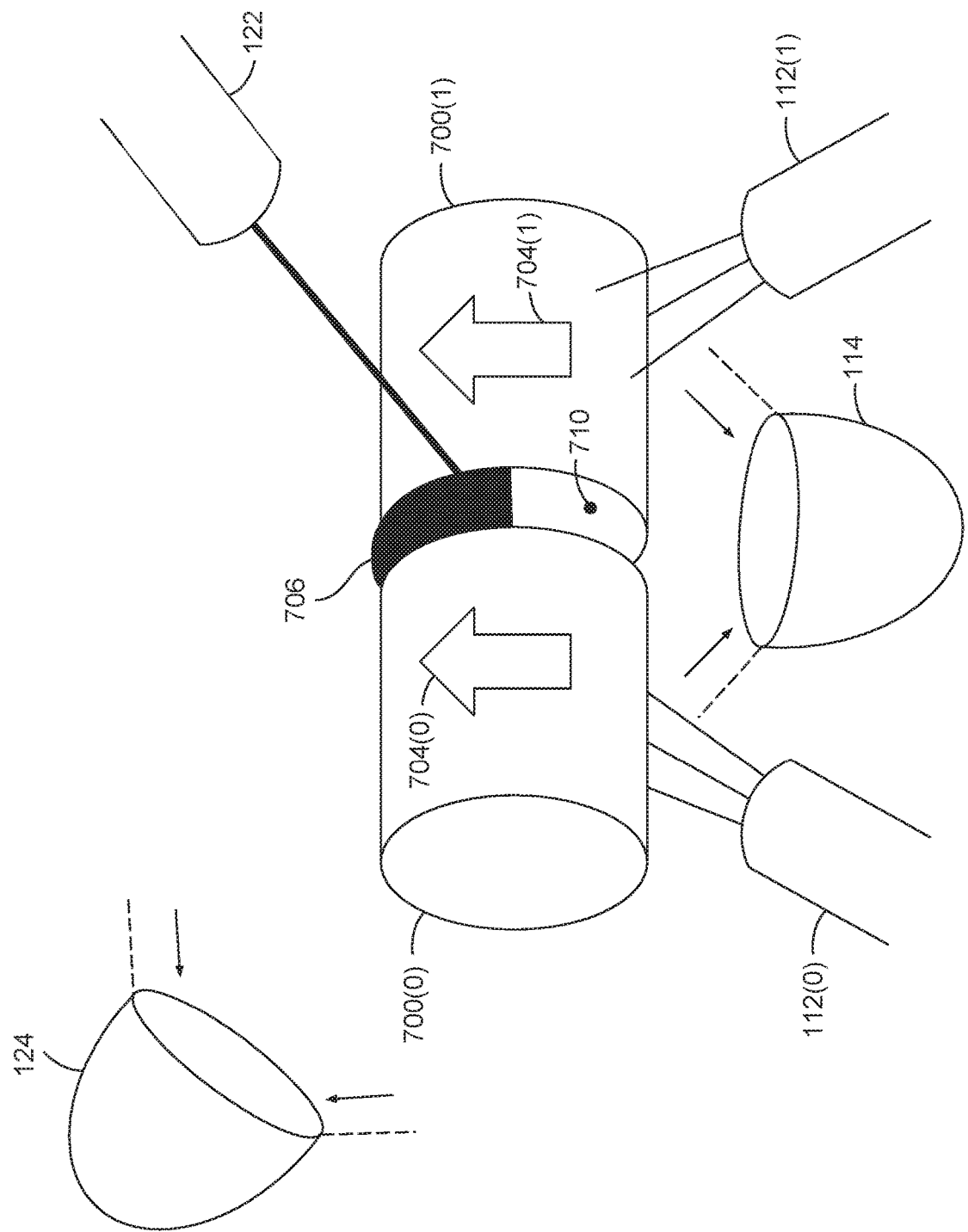

FIGS. 7A-7B illustrate how the robot system of FIG. 1 manipulates an object when depositing material onto a surface of the object, according to various embodiments of the present invention.

As shown in FIG. 7A, via separate instances of positioning tool 112, positioning robot 110 positions objects 700 for welding. Specifically, positioning robot 110 positions object 700(0) using positioning tool 112(0) and positions object 700(1) using positioning tool 112(1). Positioning robot 110 exerts force 702(0) on object 700(0) and exerts force 702(1) on object 700(1), thereby forcing those objects together and creating seam 710.

Control application 148 coordinates these positioning operations based on optical data captured via optical devices 114 and 124. Control application 148 implements object tracking to determine the positions of objects 700. Then, control application 148 causes positioning robot 110 to reposition objects 700 until seam 710 meets specific design criteria. For example, control application 148 could cause positioning robot 110 place objects 700 a specific distance apart, thereby causing seam 710 to have a particular width that is optimal for welding. Once positioned, control application 148 causes welding robot 120 to weld seam 710.

As shown in FIG. 7B, welding robot deposits welding material 712 along seam 710, thereby joining objects 700 together. In conjunction with this welding operation, positioning robot 110 rotates objects 700(0) and 700(1) by exerting parallel forces 704(0) and 704(1) onto those objects, respectively. In this manner, positioning robot 120 facilitates the welding process by presenting un-welded portions of seam 710 to welding robot 120. Control application 148 coordinates the interoperation of positioning robot 110 and welding robot 120 by controlling the relationship between rate of rotation of objects 700 and rate of welding along seam 712.

Referring generally to FIGS. 5A-7B, the exemplary positioning and welding operations discussed in conjunction with these figures represent specific scenarios where control application implements closed-loop control based on visual feedback and computer vision analysis. However, the techniques described thus can be applied to many other scenarios as well, as those skilled in the art would recognize.

In sum, a control application implements computer vision techniques to cause a positioning robot and a welding robot to perform fabrication operations. The control application causes the positioning robot to place elements of a structure at certain positions based on real-time visual feedback captured by the positioning robot. The control application also causes the welding robot to weld those elements into place based on real-time visual feedback captured by the welding robot. By analyzing the real-time visual feedback captured by both robots, the control application adjusts the positioning and welding operations in real time.

At least one advantage of the techniques described herein is that the control application can tolerate environmental variations when fabricating structures. Accordingly, if fabrication of a structure deviates from ideal conditions, the control application can rely on computer vision analysis of real-time data to adjust fabrication.

1. Some embodiments of the invention include a computer-implemented method for fabricating a structure, the method comprising: causing a first robot to position a first structural element proximate to a second structural element, processing first optical data related to the first structural element to identify a first geometrical feature associated with the first structural element, generating a first toolpath based on the first geometrical feature, and causing a second robot to deposit material on the first geometrical feature based on the first toolpath.

2. The computer-implemented method of clause 1, further comprising processing second optical data related to the second structural element to identify a second geometrical feature associated with the second structural element, wherein the first toolpath is further based on the second geometrical feature, and causing the second robot to deposit material on the second geometrical feature based on the first toolpath.

3. The computer-implemented method of any of clauses 1 and 2, wherein the first geometrical feature comprises a first face of the first structural element, the second geometrical features comprises a second face of the second structural element, and the second robot deposits the material on the second face of the second structural element to bind the first face of the first structural element to the second face of the second structural element.

4. The computer-implemented method of any of clauses 1, 2, and 3, wherein the first geometrical feature comprises a first edge of the first structural element, and processing the first optical data comprises executing an edge recognition algorithm to identify the first edge.

5. The computer-implemented method of any of clauses 1, 2, 3, and 4, further comprising: generating a second toolpath based on the first geometrical feature, and causing the second robot to deposit additional material on the first geometrical feature based on the second toolpath.

6. The computer-implemented method of any of clauses 1, 2, 3, 4, and 5, wherein the first toolpath is associated with a first material deposition pass, and the second toolpath is associated with a second material deposition pass.

7. The computer-implemented method of any of clauses 1, 2, 3, 4, 5, and 6, further comprising determining a first set of welding parameters based on the first geometrical feature, wherein the first set of welding parameters varies according to the first toolpath.

8. The computer-implemented method of any of clauses 1, 2, 3, 4, 5, 6, and 7, wherein the first geometrical feature associated with the first structural element comprises a structural variation, and the first set of welding parameters indicates that an amount of material deposited on the first geometrical feature should vary proximate to the structural variation.

9. Some embodiments include a non-transitory computer-readable medium storing program instructions that, when executed by a processor, cause the processor to fabricate a structure by performing the steps of causing a first robot to position a first structural element proximate to a second structural element, processing first optical data related to the first structural element to identify a first geometrical feature associated with the first structural element, generating a first toolpath based on the first geometrical feature, and causing a second robot to deposit material on the first geometrical feature based on the first toolpath.

10. The non-transitory computer-readable medium of clause 9, further comprising the steps of processing second optical data related to the second structural element to identify a second geometrical feature associated with the second structural element, wherein the first toolpath is further based on the second geometrical feature, and causing the second robot to deposit material on the second geometrical feature based on the first toolpath.

11. The non-transitory computer-readable medium of any of clauses 9 and 10, wherein the first geometrical feature comprises a first face of the first structural element, the second geometrical features comprises a second face of the second structural element, and the second robot deposits the material on the second face of the second structural element to bind the first face of the first structural element to the second face of the second structural element.

12. The non-transitory computer-readable medium of any of clauses 9, 10, and 11, wherein the first geometrical feature comprises a first edge of the first structural element, and processing the first optical data comprises executing an edge recognition algorithm to identify the first edge.

13. The non-transitory computer-readable medium of any of clauses 9, 10, 11, and 12, further comprising the steps of causing the first robot to position the second structural element proximate to the first structural element, wherein the first geometrical feature comprises a seam between the first structural element and the second structural element, and processing the first optical data further comprises determining a width of the seam.

14. The non-transitory computer-readable medium of any of clauses 9, 10, 11, 12, and 13 wherein the second robot deposits the material on the seam at a rate proportional to the width of the seam.

15. The non-transitory computer-readable medium of any of clauses 9, 10, 11, 12, 13, and 14, further comprising the steps of causing the first robot to reposition the first structural element and the second structural element to move the seam relative to the first robot at a first speed.

16. The non-transitory computer-readable medium of any of clauses 9, 10, 11, 12, 13, 14, and 15, wherein the second robot deposits the material on the seam at a rate proportional to the first speed.

17. Some embodiments include a system for fabricating a structure, comprising: a memory storing a control application, a processor that executes the control application to perform the steps of: processing first optical data related to a first structural element to identify a first geometrical feature associated with the first structural element, and generating a first toolpath based on the first geometrical feature; a first robot that positions the first structural element proximate to the second structural element; and a second robot that deposits material on the first geometrical feature based on the first toolpath.

18. The system of clause 17, wherein the processor executes the control application to cause the first robot to position the first structural element and cause the second robot to deposit the material.

19. The system of any of clauses 17 and 18, wherein the processor executes the control application to process second optical data related to the second structural element to identify a second geometrical feature associated with the second structural element, wherein the first toolpath is further based on the second geometrical feature, and the second robot deposits material on the second geometrical feature based on the first toolpath.

20. The system of any of clauses 18, 19, and 20, wherein the first geometrical feature comprises a first face of the first structural element, the second geometrical features comprises a second face of the second structural element, and the second robot deposits the material on the second face of the second structural element to bind the first face of the first structural element to the second face of the second structural element.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for fabricating a structure, the method comprising:
   processing, using an edge detection algorithm, first optical data related to a first structural element to identify a set of feature data, wherein the first structural element is positioned proximate to a second structural element, and the feature data includes:
      a first geometrical feature that comprises a first edge of the first structural element, and
      a first structural variation of the first structural element;
   generating, based on the set of feature data, a strategy for affixing the first structural element to the second structural element, including:
      generating a welding geometry for a first material that is to be deposited on the first geometrical feature, wherein:
         the welding geometry is separate from the first structural element and the second structural element,
         the welding geometry compensates for the first structural variation,
         the first material occupies the welding geometry, and
         the first material bonds the first structural element to the second structural element,
      generating, based on the welding geometry, a first toolpath for manipulating the first structural element relative to the second structural element,
      generating a second toolpath for welding the first structural element to the second structural element by forming the welding geometry, and
      generating a first set of welding parameters corresponding to the second toolpath that compensate for the first structural variation;
   causing, based on the first toolpath, a first robot to manipulate the first structural element; and
   causing, based on the second toolpath and the welding geometry, a second robot to deposit the first material on the first geometrical feature using the first set of welding parameters to form the welding geometry with the first material.

2. The computer-implemented method of claim 1, further comprising:
   processing second optical data related to the second structural element to identify a second geometrical feature associated with the second structural element, wherein the strategy for affixing the first structural element to the second structural element is further based on the second geometrical feature; and
   causing, based on the second toolpath, the second robot to deposit material on the second geometrical feature using the first set of welding parameters to form the welding geometry.

3. The computer-implemented method of claim 2, wherein:
   the first geometrical feature further comprises a first face of the first structural element,
   the second geometrical feature comprises a second face of the second structural element, and
   the second robot deposits the material on the second face of the second structural element to bind the first face of the first structural element to the second face of the second structural element.

4. The computer-implemented method of claim 1, wherein processing the first optical data comprises executing a texture detection algorithm to identify the first structural variation.

5. The computer-implemented method of claim 1, further comprising:
   generating, based on the first geometrical feature, a third toolpath and
   causing, based on the third toolpath, the second robot to deposit additional material on the first geometrical feature.

6. The computer-implemented method of claim 5, wherein:
   the second toolpath is associated with a first material deposition pass, and
   the third toolpath is associated with a second material deposition pass.

7. The computer-implemented method of claim 1, wherein the first set of welding parameters varies according to the second toolpath.

8. The computer-implemented method of claim 7, wherein the first set of welding parameters indicates that an amount of material deposited on the first geometrical feature varies proximate to the structural variation.

9. One or more non-transitory computer-readable media storing program instructions that, when executed by one or more processors, cause the one or more processors to fabricate a structure by performing the steps of:
   processing, using an edge detection algorithm, first optical data related to a first structural element to identify a set of feature data, wherein the first structural element is positioned proximate to a second structural element, and the feature data includes:
      a first geometrical feature that comprises a first edge of the first structural element, and
      a first structural variation of the first structural element;
   generating, based on the set of feature data, a strategy for affixing the first structural element to the second structural element, including:
      generating a welding geometry for a first material that is to be deposited on the first geometrical feature, wherein:
         the welding geometry is separate from the first structural element and the second structural element,
         the welding geometry compensates for the first structural variation,
         the first material occupies the welding geometry, and
         the first material bonds the first structural element to the second structural element,
      generating, based on the welding geometry, a first toolpath for manipulating the first structural element relative to the second structural element, generating a second toolpath for welding the first structural element to the second structural element by forming the welding geometry, and generating a first set of welding parameters corresponding to the second toolpath that compensate for the first structural variation;

causing, based on the first toolpath, a first robot to manipulate the first structural element; and causing, based on the second toolpath and the welding geometry, a second robot to deposit the first material on the first geometrical feature using the first set of welding parameters to form the welding geometry with the first material.

10. The one or more non-transitory computer-readable media of claim 9, further storing instructions that, when executed by the one or more processors, cause the one or more processors to perform the steps of:

processing second optical data related to the second structural element to identify a second geometrical feature associated with the second structural element, wherein the strategy for affixing the first structural element to the second structural element is further based on the second geometrical feature; and causing, based on the second toolpath, the second robot to deposit material on the second geometrical feature using the first set of welding parameters to form the welding geometry.

11. The one or more non-transitory computer-readable media of claim 10, wherein:

the first geometrical feature further comprises a first face of the first structural element, the second geometrical feature comprises a second face of the second structural element, and the second robot deposits the material on the second face of the second structural element to bind the first face of the first structural element to the second face of the second structural element.

12. The one or more non-transitory computer-readable media of claim 9, wherein processing the first optical data comprises executing a texture detection algorithm to identify the first structural variation.

13. The one or more non-transitory computer-readable media of claim 9, wherein:

the first geometrical feature further comprises a seam between the first structural element and the second structural element, and processing the first optical data further comprises determining a width of the seam.

14. The one or more non-transitory computer-readable media of claim 13, wherein the second robot deposits the material on the seam at a rate proportional to the width of the seam.

15. The one or more non-transitory computer-readable media of claim 13, wherein causing the first robot to manipulate the first structural element moves the seam relative to the first robot at a first speed.

16. The one or more non-transitory computer-readable media of claim 15, wherein the second robot deposits the material on the seam at a rate proportional to the first speed.

17. A system for fabricating a structure, comprising:
a memory storing a control application;
a processor that executes the control application to perform the steps of:

processing, using an edge detection algorithm, first optical data related to a first structural element to identify a set of feature data, wherein the first structural element is positioned proximate to a second structural element, and the feature data includes:

a first geometrical feature that comprises a first edge of the first structural element, and a first structural variation of the first structural element, generating, based on the set of feature data, a strategy for affixing the first structural element to a second structural element including:

generating a welding geometry for a first material that is to be deposited on the first geometrical feature, wherein (i) the welding geometry is separate from the first structural element and the second structural element, (ii) the welding geometry compensates for the first structural variation, (iii) the first material occupies the welding geometry, and (iv) the first material bonds the first structural element to the second structural element, generating, based on the welding geometry, a first toolpath for manipulating the first structural element relative to the second structural element, generating a second toolpath for welding the first structural element to the second structural element by forming the welding geometry, and generating a first set of welding parameters corresponding to the second toolpath that compensate for the first structural variation;

a first robot that, based on the first toolpath, positions a first structural element proximate to the second structural element; and a second robot that, based on the second toolpath and the welding geometry, deposits the first material on the first geometrical feature using the first set of welding parameters to form the welding geometry with the first material.

18. The system of claim 17, wherein the processor executes the control application to:

process second optical data related to the second structural element to identify a second geometrical feature associated with the second structural element, wherein the strategy for affixing the first structural element to the second structural element is further based on the second geometrical feature, and wherein the second robot deposits material on the second geometrical feature using the first set of welding parameters to form the welding geometry.

19. The system of claim 18, wherein:

the first geometrical feature comprises a first face of the first structural element, the second geometrical feature comprises a second face of the second structural element, and the second robot deposits the material on the second face of the second structural element to bind the first face of the first structural element to the second face of the second structural element.

* * * * *